United States Patent
Wassmer et al.

(10) Patent No.: US 7,124,768 B2
(45) Date of Patent: Oct. 24, 2006

(54) METHOD FOR TRANSFERRING AQUEOUS POLYMER DISPERSIONS FROM ONE CONTAINER TO ANOTHER CONTAINER

(75) Inventors: Karl-Heinz Wassmer, Mutterstadt (DE); Hardy Korb, Bad Duerkheim (DE); Steffen Funkhauser, Viernheim (DE); Martin Meister, Neustadt (DE); Gerald Wildburg, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 426 days.

(21) Appl. No.: 10/467,168

(22) PCT Filed: Feb. 2, 2002

(86) PCT No.: PCT/EP02/01093

§ 371 (c)(1),
(2), (4) Date: Aug. 13, 2003

(87) PCT Pub. No.: WO02/064640

PCT Pub. Date: Aug. 22, 2002

(65) Prior Publication Data

US 2004/0050419 A1    Mar. 18, 2004

(30) Foreign Application Priority Data

Feb. 13, 2001  (DE) ................. 101 07 044

(51) Int. Cl.
*F17D 1/18*  (2006.01)
(52) U.S. Cl. .................. 137/14; 137/571; 528/500; 528/501
(58) Field of Classification Search .......... 137/14, 137/571; 528/500, 501
See application file for complete search history.

(56) References Cited

U.S. PATENT DOCUMENTS 3,968,067 A * 7/1976 Burke, Jr. ................ 523/328

FOREIGN PATENT DOCUMENTS

| DE | 40 03 422 | 8/1991 |
|---|---|---|
| DE | 196 24 299 | 1/1997 |
| DE | 196 21 027 | 11/1997 |
| DE | 198 47 115 | 10/1998 |
| DE | 197 41 184 | 3/1999 |
| DE | 197 41 187 | 3/1999 |
| DE | 198 05 122 | 4/1999 |
| DE | 198 28 183 | 12/1999 |
| DE | 198 39 199 | 3/2000 |
| DE | 198 40 586 | 3/2000 |
| EP | 0 890 582 | 1/1999 |
| EP | 1 024 152 | 8/2000 |
| FR | 2 347 387 | 11/1977 |
| WO | 95/33775 | 12/1995 |

OTHER PUBLICATIONS

Encyclopedia of Polymer Science and Engineering, vol. 8, pp. 659-677 1987.
D.C. Blackley Emulsion Polymerisation, pp. 155-465 1975.
D.C. Blackley Polymer Latices, 2nd Edition, vol. 1, pp. 33-415. 1997
H. Warson The Applications of Synthetic Resin Emulsions, pp. 49-244 1972.
D. Diederich Chemie in Unserer Zeit, vol. 24, pp. 135-142 1990.
J. Piirma Emulsion Polymerisation, pp. 1-287 1982.
F. Hoelscher Dispersionen Synthetischer Hochpolymerer, pp. 1-160 1969.

* cited by examiner

Primary Examiner—A. Michael Chambers
(74) Attorney, Agent, or Firm—Oblon, Spivak, McClelland, Maier & Neustadt, P.C.

(57) ABSTRACT

A method of transferring an aqueous polymer dispersion with a temperature $\geq 50°$ C. from a vessel 1 via a connecting line to a vessel 2 is described.

16 Claims, No Drawings

METHOD FOR TRANSFERRING AQUEOUS POLYMER DISPERSIONS FROM ONE CONTAINER TO ANOTHER CONTAINER

The present invention relates to an improved method of transferring an aqueous polymer dispersion with a temperature $\geq 50°$ C. from a vessel 1 via a connecting line to a vessel 2, wherein the vessel 2, before and during the transfer, contains water vapor with a partial pressure of $\geq 100$ mbar.

Aqueous polymer dispersions are common knowledge. They are fluid systems which constitute as their disperse phase polymer coils consisting of a plurality of interlooped polymer chains, known as the polymer matrix or polymer particles, in disperse distribution in the aqueous dispersion medium. The diameter of the polymer particles is frequently in the range from 10 to 5000 nm. Aqueous polymer dispersions are used in a large number of industrial applications in the form of binders, in paints or renders, for example, in coatings for leather, paper or polymer films, and as components in adhesives.

Aqueous polymer dispersions are obtainable in particular by free-radically initiated aqueous emulsion polymerization of ethylenically unsaturated monomers. This method has been the subject of many prior descriptions and is therefore adequately known to the skilled worker [cf., e.g., Encyclopedia of Polymer Science and Engineering, Vol. 8, pages 659 to 677, John Wiley & Sons, Inc., 1987; D.C. Blackley, Emulsion Polymerisation, pages 155to 465, Applied Science Publishers, Ltd., Essex, 1975; D.C. Blackley, Polymer Latices, 2nd Edition, Vol. 1, pages 33 to 415, Chapman & Hall, 1997; H. Warson, The Applications of Synthetic Resin Emulsions, pages 49 to 244, Ernest Benn, Ltd., London, 1972; D. Diederich, Chemie in unserer Zeit 1990, 24, pages 135 to 142, Verlag Chemie, Weinheim; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969 and the patent DE-A 40 03 422]. Free-radically initiated aqueous emulsion polymerization normally takes place in such a way that the monomers, often with the use of dispersing aids, are dispersed in the aqueous medium and polymerized by means of at least one free-radical polymerization initiator.

Suitable reaction temperatures for the free-radical aqueous emulsion polymerization cover the entire range up to 170° C.; temperatures of from 70 to 120° C., preferably from 80 to 100° C., and with particular preference >85 to 100° C., however, are preferably employed. Free-radical aqueous emulsion polymerization may be conducted at a pressure of less than, equal to or greater than 1 bar (absolute), so that the polymerization temperature may exceed 100° C. and may be up to 170° C. Volatile monomers such as ethylene, butadiene or vinyl chloride are preferably polymerized under elevated pressure. In this case the pressure may be 1.2, 1.5, 2, 5, 10, 15 bar or even higher. Where emulsion polymerizations are conducted under subatmospheric pressure, the pressures set are 950 mbar, frequently 900 mbar, and often 850 mbar (absolute). Free-radical aqueous emulsion polymerization is advantageously conducted at 1 bar (absolute) under an inert gas atmosphere, such as under nitrogen or argon, for example.

In many cases, in the aqueous polymer dispersions obtained, the residual amounts of unreacted monomers are lowered by chemical and/or physical methods which are likewise known to the skilled worker [see, for example, EP-A 771328, DE-A 19624299, DE-A 19621027, DE-A 19741184, DE-A 19741187, DE-A 19805122, DE-A 19828183, DE-A 19839199, DE-A 19840586and 19847115], the polymer solids content is adjusted to a desired level by dilution or concentration, or further customary additives, such as bactericides or foam suppressant additives, for example, are added to the aqueous polymer dispersions.

On the industrial scale in particular it is advantageous for the process steps following the aqueous emulsion polymerization not to be carried out in the polymerization reactor, which is extensively equipped in terms of its apparatus and the measurement and control technology, but instead in a more simply equipped reaction vessel, such as a so-called blow down reactor or formulating vessel. For this purpose, after the end of the polymerization reaction, in which the ethylenically unsaturated monomers have been reacted to an extent $\geq 90\%$ by weight, preferably $\geq 95\%$ by weight, and in particular $\geq 98\%$ by weight, the resulting aqueous polymer dispersion is transferred without cooling, via a connecting line, into the downstream reaction vessel. In this context it has been proposed to carry out the transfer by pumping the aqueous polymer dispersion into the reaction vessel or forcing it into the reaction vessel by applying a nitrogen or water vapor overpressure in the polymerization reactor. In particular it is advantageous for this reaction vessel to be sited at a lower level than, or even beneath, the polymerization reactor. In this case the aqueous polymer dispersion may be drained simply into the reaction vessel, utilizing gravity. So that the transfer of the aqueous polymer dispersion to the reaction vessel is particularly rapid and the polymerization reactor is thus made available as quickly as possible again for the preparation of the next polymer dispersion, the aqueous polymer dispersion is often both pumped and forced into a lower-lying reaction vessel.

In order that there is no buildup in this second reaction vessel of an overpressure which would again slow down or delay the transfer operation, this vessel is either vented to the atmosphere (for example, by way of an offgas scrubber or muffle flare) or evacuated to a pressure <100 mbar (absolute) prior to the transfer. However, this process has been found disadvantageous in that, during the transfer, and irrespective of whether the aqueous polymer dispersion is drained off, pumped and/or forced in circulation, unwanted polymer coagulum is formed in the aqueous polymer dispersion. This polymer coagulum, with a particle size ranging from a few micrometers up to a few centimeters, may reduce the clarity of the films formed from the polymers (gel specks), reduce the binding power of the polymers in paint, render, coating, and adhesive formulations, or lead to disruptive deposits in production plant and processing machines.

It is an object of the present invention to provide a method of transferring an aqueous polymer dispersion with a temperature $\geq 50°$ C. from a vessel 1 via a connecting line to a vessel 2 while preventing or at least reducing the formation of polymer coagulum.

We have found that this object is achieved by the method described above.

For the purposes of this document, vessels are reactors, stirred tanks, interim containers and storage containers, and also freight containers, drums, cannisters and cans, etc., of any of a very wide variety of sizes and shapes. The material from which the vessels are constructed is not important. For example, a very wide variety of alloyed and unalloyed grade steels, chemically resistant stainless steel types, such as 1.4541 and 1.4571 steel, and also aluminum, with or without a very wide variety of internal coatings, such as enamel, silver, zinc and tin or plastics, such as PTFE and coatings, or plastics, such as polyethylene, polypropylene, polystyrene, polyacrylamide, and glass fiber reinforced synthetic resins, for example, are employed. These vessels may contain any of a very wide variety of internals, such as stirrers, heat exchangers, heating coils and/or cooling coils, flow disruptors and sensors, for example, and also a wide variety of connections and openings, which may be closeable by closures, such as ballcocks, valves of myriad construction, and also screw lids, etc.

In accordance with the invention it is advantageous if the temperature of the inner surfaces of the connecting line and of the vessel 2 with which the aqueous polymer dispersion comes into contact during the transfer is less than or equal to the temperature of the aqueous polymer dispersion in vessel 1.

The temperature of the aqueous polymer dispersion is often $\geq 50°$ C., $\geq 60°$ C., $\geq 70°$ C., $\geq 80°$ C. or $\geq 90°$ C. and also $\leq 170°$ C., $\leq 150°$ C., $\leq 130°$ C., $\leq 110°$ C., $\leq 100°$ C., $\leq 95°$ C. or $\leq 90°$ C., and all values inbetween. In general, however, the temperature is situated between 50 and 100° C., frequently between 60 and 95° C., and in particular between 65 and 90° C.

Essential to the method is that the water vapor partial pressure in vessel 2 before and during the transfer of the aqueous polymer dispersion is $\geq 100$ mbar. It is of advantage if the water vapor partial pressure in vessel 2 is $\geq 70\%$, $\geq 80\%$ or $\geq 90\%$ and $\leq 100\%$ of the water vapor partial pressure of the aqueous polymer dispersion in vessel 1.

The water vapor partial pressure of the aqueous polymer dispersion in vessel 1 is in principle dependent on the water content, temperature, and other constituents of the aqueous polymer dispersion. It may be determined simply, in a first approximation, by introducing, say, the aqueous polymer dispersion at 20° C. into a closeable container to which a pressure measuring device is connected, and evacuating the container to a self-determined final pressure, 30 mbar (absolute) for example. The aqueous polymer dispersion is subsequently heated to the temperature it has in vessel 1. The equilibrium pressure which becomes established in the container, minus the residual pressure obtaining beforehand, then gives the water vapor partial pressure of the aqueous polymer dispersion at the specified temperature. It is of importance that the water vapor partial pressure of an aqueous polymer dispersion at a given temperature corresponds in good approximation to the water vapor partial pressure of pure water at the same temperature. The temperature dependency of the water vapor partial pressure of water is known to the skilled worker or can be looked up by said skilled worker in familiar reference works, an example being the Handbook of Chemistry and Physics, 80$^{th}$ Edition, 1999–2000, Sections 6–10 to 6–11, CRC-Press.

The water vapor partial pressure of vessel 2 may be set, for example, by heating the tank wall and the internals of the empty vessel 2 to a temperature less than or equal to the temperature of the aqueous polymer dispersion in vessel 1 and introducing water vapor with the same or a lower temperature to displace the gas present in the vessel 2, frequently air or nitrogen. Before the transfer of the aqueous polymer dispersion, any water vapor condensate produced can be separated off.

It is particularly advantageous if before the transfer the empty vessel 2 is evacuated to a pressure of $\leq 100$ mbar, $\leq 90$ mbar or $\leq 80$ mbar (absolute) and then by introduction of water vapor a water vapor pressure of $\geq 100$ mbar, $\geq 200$ mbar, $\geq 300$ mbar, $\geq 400$ mbar, $\geq 500$ mbar, $\geq 600$ mbar or $\geq 700$ mbar and $\leq 1000$ mbar, $\leq 900$ mbar, $\leq 800$ mbar or $\leq 700$ mbar and all values inbetween is set. Frequently, in vessel 2 before the transfer a water vapor partial pressure of from 300 to 700 mbar is set. It is important that the transfer of the aqueous polymer dispersion normally takes place without pressure compensation or deairing of the vessel 2.

In another embodiment of the method of the invention, first the connecting line is filled with the aqueous polymer dispersion and then the aqueous polymer dispersion is transferred to the vessel 2. For this purpose it is necessary for there to be a blocking means, such as a ball cock, valve or sliding blocker, present at least at both ends of the connecting line, i.e., in the vicinity of the discharge opening of the vessel 1 and/or of the inlet opening of the vessel 2. In the case of relatively long connecting lines, furthermore, a venting line is advantageous. In accordance with the invention, then, first the connecting line is filled with aqueous polymer dispersion, before the transfer, by opening of the blocking means on the discharge opening of the vessel 1 and, where present, of the venting line. Only thereafter is the blocking means opened at the inlet opening of the vessel 2 and the aqueous polymer dispersion transferred into the vessel 2. This embodiment is especially effective when the vessel 2 has an underpressure.

The method of the invention prevents or reduces advantageously the formation of disruptive polymer coagulum in aqueous polymer dispersions during their transfer from one vessel to another. Likewise prevented or reduced are polymer deposits in the connecting line and on the inlet opening of the vessel 2. The present process is easy to realize industrially and ensures optimum utilization of polymerization capacities in the preparation of aqueous polymer dispersions. Furthermore, the process described is in principle not restricted to aqueous polymer dispersions, but instead may be employed generally with aqueous or nonaqueous polymer dispersions, solutions or suspensions. Where in this case, for example, a nonaqueous medium is used to take up the polymers, however, it is the vapor of the nonaqueous medium used to take up the polymers, rather than water vapor, which is to be used.

EXAMPLES

Analysis

The number-average particle diameter of the polymer particles was determined by dynamic light scattering on an aqueous dispersion with a concentration of from 0.005 to 0.01 percent by weight at 23° C. using an Autosizer IIC from Malvern Instruments, Great Britain. The reported figure is the average diameter of the cumulant evaluation (cumulant z-average) of the measured autocorrelation function (ISO Standard 13 321).

The solids content was determined by drying an aliquot of the aqueous polymer dispersion in a drying oven at 140° C. for 6 hours. Two separate measurements were conducted. The reported value represents the average of the two measurements.

The amount of coagulum was determined by filtration through a metal sieve with a mesh size of 45 µm. For this, 100 g of the aqueous polymer dispersion were filtered through the 45 µm sieve, which was weighed before filtration, at from 20 to 25° C. (room temperature). Following filtration, the sieve was rinsed with a little deionized water and then dried to constant weight in a drying oven at 100° C. under atmospheric pressure. After cooling to room temperature, the sieve was weighed again. The amount of coagulum was found from the difference between the individual weighings, based in each case on the amount of aqueous polymer dispersion filtered.

Transfer tests

The transfer tests were carried out with an acrylate dispersion which had a solids content of 50.3% by weight and whose polymer particles were obtained by polymerizing a monomer mixture containing 87.2% by weight 2-ethylhexylacrylate, 10.8% by weight acrylonitrile and 2.0% by weight acrylic acid. The number-average particle diameter was 370 nm. The amount of coagulum >45 µm was found to be 0.06% by weight.

The apparatus used for the transfer tests consisted of two heatable 2 l double-walled stainless steel vessels, vessel 1 being equipped with an anchor stirrer, thermometer, filling port and one connection each to a vacuum system and to a water vapor system, and vessel 2 being equipped with one connection each to a vacuum system, a water vapor system and an air supply system, an anchor stirrer, a thermometer, and a discharge port. Between the vessels there was a stainless steel transfer line approximately 70 cm in length which had an internal diameter of 6 mm and a blocking means at both ends. The blocking means close to the outlet opening of vessel 1 is referred to as "outlet tap" below and the blocking means close to the inlet opening of vessel 2 is referred to as "inlet tap". Vessel 1 was arranged above vessel 2 with a lateral offset. The outlet opening of vessel 1, which opened into the transfer line, was located in the base of said vessel 1, while the inlet opening of vessel 2, which opened into the transfer line, was situated in the lid of said vessel 2. Prior to the transfer tests, both vessels and the transfer line were empty and dry.

Example 1

1.5 l of the abovementioned aqueous polymer dispersion were introduced into vessel 1 at 85° C. with stirring (100 revolutions per minute). Vessel 2 and the transfer line (inlet tap on vessel 2 open and outlet tap on vessel 1 closed) were evacuated to 50 mbar (absolute) and the inner vessel walls were heated to 85° C. Subsequently, the vacuum line and the inlet tap were closed and water vapor was introduced into vessel 2 up to an internal vessel pressure of 500 mbar (absolute). Thereafter the outlet tap was slowly opened, so that the transfer line was slowly flooded with aqueous polymer dispersion. Subsequently 2 bar of water vapor were injected into vessel 1 and the inlet tap was opened in such a way that transfer of the aqueous polymer dispersion into vessel 2 took 30 seconds. Immediately after the emptying of vessel 1, the water vapor line and the outlet tap, and only then the inlet tap, were closed. The stirrer in vessel 2 was subsequently switched on (100 revolutions per minute) and the aqueous polymer dispersion was stirred for 60 seconds. Thereafter the air supply line was opened and the aqueous polymer dispersion was cooled to room temperature.

The amount of coagulum >45 µm in the aqueous polymer dispersion obtained after transfer was found to be 0.31% by weight.

Example 2

Example 2 was carried out as for example 1 except that water vapor was introduced into vessel 2 up to an internal vessel pressure of 550 mbar (absolute).

The amount of coagulum >45 µm in the aqueous polymer dispersion obtained after transfer was found to be 0.22% by weight.

Example 3

Example 3 was carried out as for example 1 except that water vapor was introduced into vessel 2 up to an internal vessel pressure of 600 mbar (absolute).

The amount of coagulum >45 µm in the aqueous polymer dispersion obtained after transfer was found to be 0.17% by weight.

Example 4

Example 4 was carried out as for example 1 except that water vapor was introduced into vessel 2 up to an internal vessel pressure of 630 mbar (absolute).

The amount of coagulum >45 µm in the aqueous polymer dispersion obtained after transfer was found to be 0.06% by weight.

Comparative Example

The comparative example was carried out as for example 1 except that no water vapor was introduced into vessel 2.

The amount of coagulum >45 µm in the aqueous polymer dispersion obtained after transfer was found to be 0.66% by weight.

We claim:

1. A method of transferring an aqueous polymer dispersion, which comprises:
   transferring the aqueous polymer dispersion with a temperature $\geq 50°$ C. from a vessel 1 via a connecting line to a vessel 2, wherein the vessel 2, before and during the transfer, contains water vapor with a water vapor partial pressure $\geq 100$ mbar.

2. A method as claimed in claim 1, wherein the temperature of the inner surfaces of the connecting line and of the vessel 2 with which the aqueous polymer dispersion comes into contact during the transfer is less than or equal to the temperature of the aqueous polymer dispersion in vessel 1.

3. A method as claimed in claim 1, wherein the water vapor partial pressure in vessel 2 is greater than or equal to 70% of the water vapor partial pressure of the aqueous polymer dispersion in vessel 1.

4. A method as claimed in claim 1, wherein before the transfer occurs the vessel 2 is evacuated to a pressure of $\geq 100$ mbar (absolute), then in vessel 2 a water vapor partial pressure of from 300 to 700 mbar is set and thereafter the aqueous polymer dispersion is transferred to the vessel 2 without pressure compensation.

5. A method as claimed in claim 1, wherein first the connecting line is filled with the aqueous polymer dispersion and then the aqueous polymer dispersion is transferred to the vessel 2.

6. A method of transferring a polymer dispersion, solution or suspension, which comprises:
   transferring a polymer dispersion, solution or suspension from a vessel 1 via a connecting line to a vessel 2, wherein the vessel 2, before and during the transfer, contains vapor of the liquid medium which was used to take up the polymer, and the vapor pressure of the liquid medium is $\geq 70\%$ of the equilibrium vapor pressure of the liquid medium at the temperature possessed by the polymer dispersion, solution or suspension during the transfer.

7. A method as claimed in claim 2, wherein the water vapor partial pressure in vessel 2 is greater than or equal to 70% of the water vapor partial pressure of the aqueous polymer dispersion in vessel 1.

8. A method as claimed in claim 2, wherein before the transfer occurs the vessel 2 is evacuated to a pressure of $\geq 100$ mbar (absolute), then in vessel 2 a water vapor partial pressure of from 300 to 700 mbar is set and thereafter the aqueous polymer dispersion is transferred to the vessel 2 without pressure compensation.

9. A method as claimed in claim 3, wherein before the transfer occurs the vessel 2 is evacuated to a pressure of $\geq 100$ mbar (absolute), then in vessel 2 a water vapor partial pressure of from 300 to 700 mbar is set and thereafter the aqueous polymer dispersion is transferred to the vessel 2 without pressure compensation.

10. A method as claimed in claim 2, wherein first the connecting line is filled with the aqueous polymer dispersion and then the aqueous polymer dispersion is transferred to the vessel 2.

11. A method as claimed in claim 3, wherein first the connecting line is filled with the aqueous polymer dispersion and then the aqueous polymer dispersion is transferred to the vessel 2.

12. A method as claimed in claim 4, wherein first the connecting line is filled with the aqueous polymer dispersion and then the aqueous polymer dispersion is transferred to the vessel 2.

13. A method as claimed in claim 1, wherein vessel 2 is empty before the transfer of the aqueous polymer dispersion.

14. A method as claimed in claim 1, which is discontinuous.

15. A method as claimed in claim 6, wherein vessel 2 is empty before the transfer of the aqueous polymer dispersion.

16. A method as claimed in claim 6, which is discontinuous.

* * * * *